(12) United States Patent
Kim

(10) Patent No.: US 11,085,835 B2
(45) Date of Patent: Aug. 10, 2021

(54) CAPACITIVE SENSOR

(71) Applicant: ROBOTOUS CO., LTD., Seongnam (KR)

(72) Inventor: Min Chul Kim, Seongnam (KR)

(73) Assignee: ROBOTOUS CO., LTD., Seongnam (KR)

( * ) Notice: Subject to any disclaimer, the term of this patent is extended or adjusted under 35 U.S.C. 154(b) by 186 days.

(21) Appl. No.: 16/466,009

(22) PCT Filed: Nov. 2, 2017

(86) PCT No.: PCT/KR2017/012296
§ 371 (c)(1),
(2) Date: May 31, 2019

(87) PCT Pub. No.: WO2018/101617
PCT Pub. Date: Jun. 7, 2018

(65) Prior Publication Data
US 2019/0310142 A1    Oct. 10, 2019

(30) Foreign Application Priority Data
Dec. 2, 2016 (KR) .................. 10-2016-0163385

(51) Int. Cl.
*G01L 1/04* (2006.01)
*G01D 5/241* (2006.01)
(Continued)

(52) U.S. Cl.
CPC .............. *G01L 1/04* (2013.01); *G01D 5/2417* (2013.01); *G01L 1/14* (2013.01); *G01L 3/00* (2013.01)

(58) Field of Classification Search
CPC .... G01L 1/04; G01L 1/14; G01L 3/00; G01D 5/2417
See application file for complete search history.

(56) References Cited

U.S. PATENT DOCUMENTS 4,552,028 A    11/1985 Burckhardt et al.
5,437,196 A    8/1995 Okada
(Continued)

FOREIGN PATENT DOCUMENTS

CN    101458133 A    6/2009
CN    103080716 A    5/2013
(Continued)

OTHER PUBLICATIONS

International Search Report issued in related application No. PCT/KR2017012296 dated Feb. 7, 2018.

*Primary Examiner* — Max H Noori

(57) ABSTRACT

A capacitive sensor includes an upper block; a lower block; a plurality of elastic supports for elastically supporting the upper block and the lower block; upper vertical electrodes formed to have faces perpendicular to the bottom surface of the upper block; lower vertical electrodes formed to have faces perpendicular to the top surface of the lower block and disposed to face the upper vertical electrodes such that at least parts of the lower vertical electrodes overlap with the upper vertical electrodes; and an electronic circuit including the upper vertical electrodes and the lower vertical electrodes as parts of the circuit and outputting a signal corresponding to changes in capacitances between the upper vertical electrodes and the lower vertical electrodes caused by a force or a torque applied to at least one of the upper block and the lower block.

9 Claims, 22 Drawing Sheets

(51) Int. Cl.
*G01L 1/14* (2006.01)
*G01L 3/00* (2006.01)

(56) References Cited

U.S. PATENT DOCUMENTS

| | | | |
|---|---|---|---|
| 6,990,867 | B2 | 1/2006 | Okada |
| 8,366,286 | B2 * | 2/2013 | Kobayashi ............... G06F 3/041 |
| | | | 362/85 |
| 8,915,151 | B2 * | 12/2014 | Choi ...................... H01H 13/85 |
| | | | 73/862.391 |
| 2012/0017703 | A1 * | 1/2012 | Ikebe .................... G06F 3/0446 |
| | | | 73/862.626 |
| 2013/0167661 | A1 | 7/2013 | Nishioki et al. |
| 2014/0230576 | A1 | 8/2014 | Felix et al. |
| 2014/0331787 | A1 * | 11/2014 | Brookhuis ............... G01L 1/142 |
| | | | 73/862.042 |
| 2015/0292969 | A1 | 10/2015 | Choi et al. |
| 2016/0041049 | A1 | 2/2016 | Okada et al. |
| 2016/0265987 | A1 | 9/2016 | Choi et al. |

FOREIGN PATENT DOCUMENTS

| | | | |
|---|---|---|---|
| CN | 104272073 | A | 1/2015 |
| JP | 2007315878 | A | 12/2007 |
| KR | 101266210 | B1 | 5/2013 |
| KR | 101470160 | B1 | 12/2014 |
| KR | 101477120 | B1 | 12/2014 |
| KR | 101533920 | B1 | 7/2015 |

* cited by examiner

CAPACITIVE SENSOR

CROSS-REFERENCE TO RELATED APPLICATION

This application is a U.S. National Stage of PCT/KR2017/012296, filed Nov. 2, 2017, which claims the benefit of Korean Patent Application Nos. 10-2016-0163385, filed on Dec. 2, 2016, in the Korean Intellectual Property Office.

TECHNICAL FIELD

The present invention relates to a capacitive sensor, and more specifically, to a capacitive sensor for sensing 6-axis forces/torques using capacitance variations.

BACKGROUND ART

Most conventional force/torque sensors use a method of sensing or measuring a force/torque using a strain gauge.

In general, a sensor using a strain gauge includes a pair of external connectors to which an external force is applied, an elastic body which connects the external connectors, and a strain gauge attached to the elastic body to measure strain of the elastic body. The strain gauge senses or measures an external force applied to the external connectors by sensing a resistance that varies according to strain of the elastic body deformed by the external force.

Sensors using a strain gauge are manufactured in such a manner that a plurality of strain gauges is attached to an elastic body. With respect to such a manufacturing process, problems such as manufacturing cost increase and hardening of an adhesive used to attach strain gauges after a lapse of long time, which causes the adhesive to be easily damaged, are frequently generated.

Although sensors that measure strain of an elastic body through an optical method have been recently developed, a large number of optical components needs to be used therefor and thus manufacture difficulty and manufacturing costs increase.

DISCLOSURE

Technical Problem

An object of the present invention is to provide a capacitive sensor having a simple structure for reducing manufacture difficulty and improving durability.

Technical objects to be achieved by the present invention are not limited to the aforementioned technical objects, and other technical objects not described above may be evidently understood by a person having ordinary skill in the art to which the present invention pertains from the following description.

Technical Solution

A capacitive sensor according to an embodiment of the present invention to accomplish the aforementioned object includes: an upper block; at least one first electrode fixed to the upper block; a lower block positioned below the upper block; at least one second electrode fixed to the lower block such that at least a part of the second electrode and the first electrode overlap; and a plurality of elastic supports including a first support column for supporting the upper block, a second support column for supporting the lower block, and an elastic deformation part connected to the first support column and the second support column and elastically deformed by an external force acting on at least one of the upper block and the lower block.

At least a part of the elastic deformation part may be formed in a closed loop shape.

At least a part of the elastic deformation part may be formed in a zigzag shape.

At least a part of the elastic deformation part may be formed in a Y shape.

The elastic deformation part may include a pair of horizontal beams separated from each other and a vertical beam connecting the horizontal beams.

The first support column may include a first vertical support rod upwardly extended from the elastic deformation part and the second support column may include a second vertical support rod downwardly extended from the elastic deformation part, and the first vertical support rod and the second vertical support rod may be positioned on different axial lines from the vertical beam.

The elastic deformation part may include a pair of vertical beams separated from each other and a horizontal beam connecting the vertical beams.

The first support column may be extended from one of the pair of vertical beams and the second support column may be extended from the other of the pair of vertical beams.

One of the first support column and the second support column may be extended from at least one of the pair of vertical beams and the other of the first support column and the second support column may be extended from the horizontal beam.

The elastic deformation part may include a plurality of separated horizontal beams and a plurality of vertical beams connecting the plurality of horizontal beams, and the plurality of vertical beams may be positioned on different axial lines.

The elastic deformation part may include a plurality of separated vertical beams and a plurality of horizontal beams connecting the plurality of vertical beams, and the plurality of horizontal beams may be positioned on different axial lines.

Other specific details of the present invention are included in the detailed description and drawings.

Advantageous Effects

According to embodiments of the present invention, the following effects are obtained.

Manufacture difficulty can be reduced through a simple structure, durability can be improved, and 6-axis forces/torques can be sensed more accurately.

Effects which may be obtained by the present invention are not limited to the aforementioned effects, and other technical effects not described above may be evidently understood by a person having ordinary skill in the art to which the present invention pertains from the following description.

MODE FOR INVENTION

Figure 1:
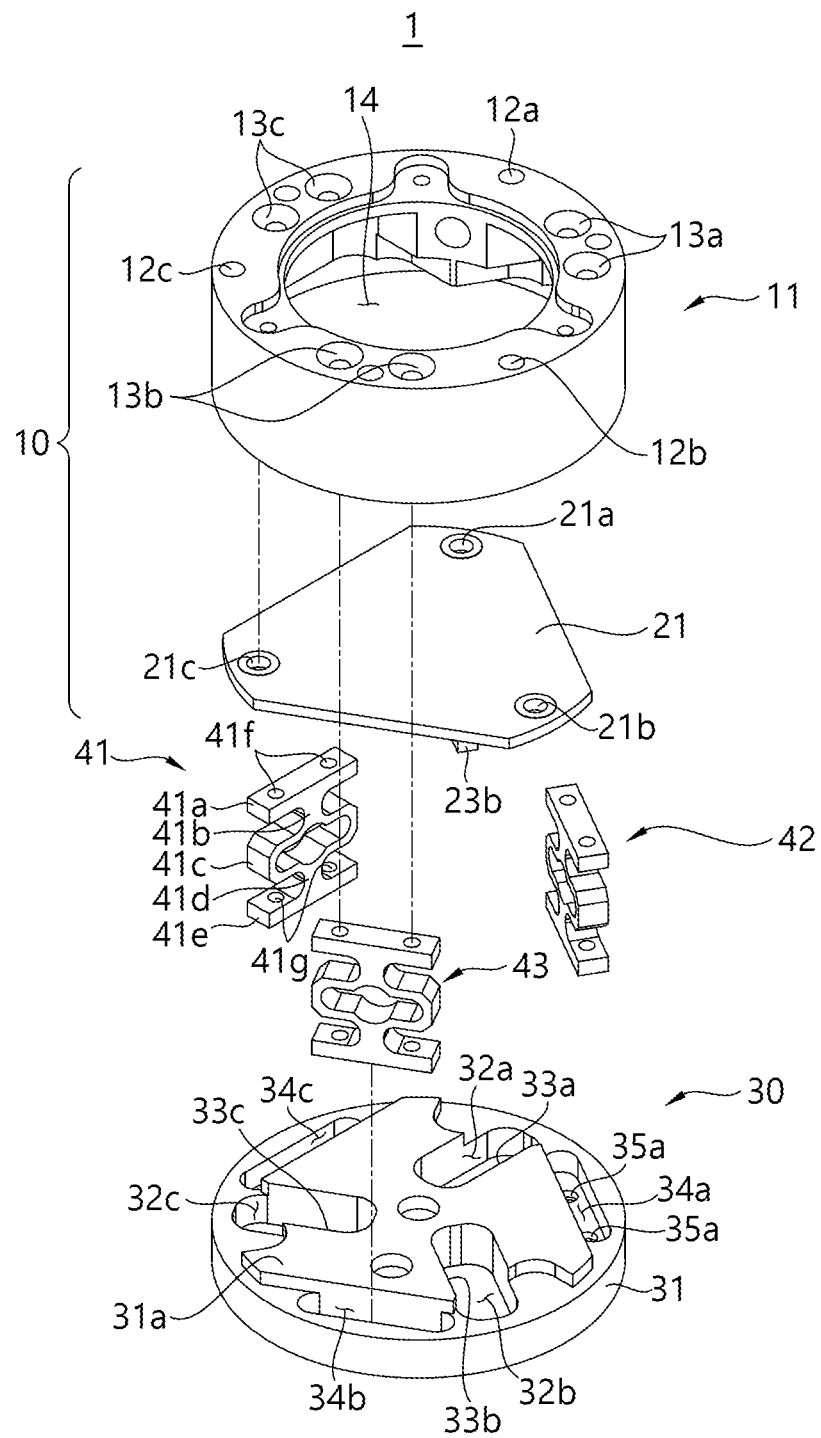
FIG. 1 is an exploded perspective view showing a capacitive sensor according to a first embodiment of the present invention.

The advantages, features and methods for accomplishing the same of the present invention will become more apparent through the following detailed description with respect to the accompanying drawings. However, the present invention is not limited by embodiments described blow and is implemented in various different forms, and the embodiments are provided so that the present invention will be thorough and complete, and will fully convey the scope of the invention to those skilled in the art. The present invention is defined by the scope of the claims. The same reference numbers will be used throughout the specification to refer to the same parts.

Furthermore, embodiments described in the disclosure will be explained with reference to cross-sectional views and/or schematic diagrams which are ideal illustrations. Accordingly, the forms of illustrations may be modified according to manufacturing technique and/or allowable error. In addition, components in the drawings of the present invention may be enlarged or reduced for convenience. The same reference numbers refer to the same parts throughout the specification.

Hereinafter, the present invention will be described with reference to the drawings for describing a capacitive sensor according to embodiments of the present invention.

Figure 2:
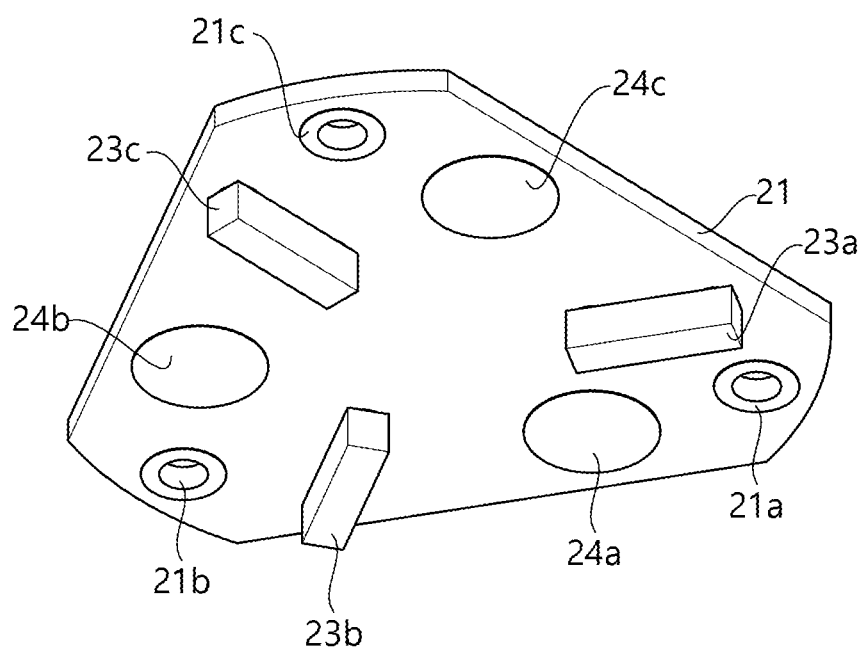
FIG. 2 is a perspective view showing the bottom surface of an upper block of the capacitive sensor according to the first embodiment of the present invention.
Figure 3:
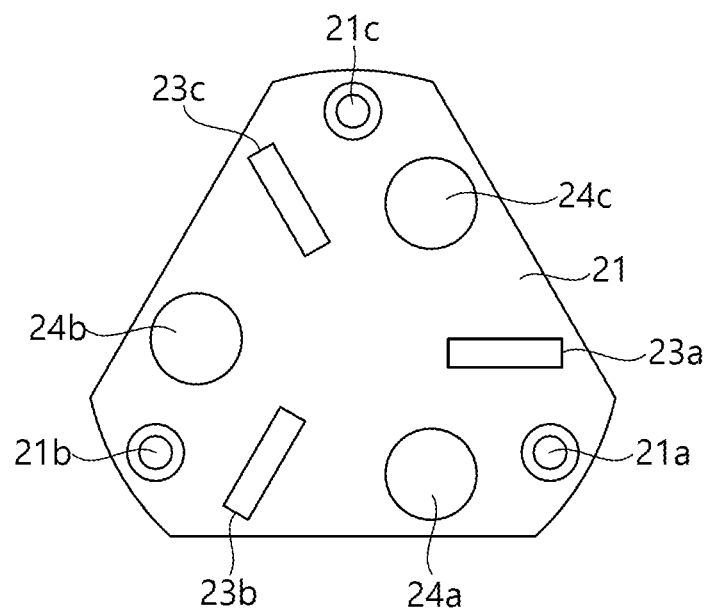
FIG. 3 is a diagram showing the bottom surface of the upper block and the top surface of a lower block of the capacitive sensor according to the first embodiment of the present invention.
Figure 3:
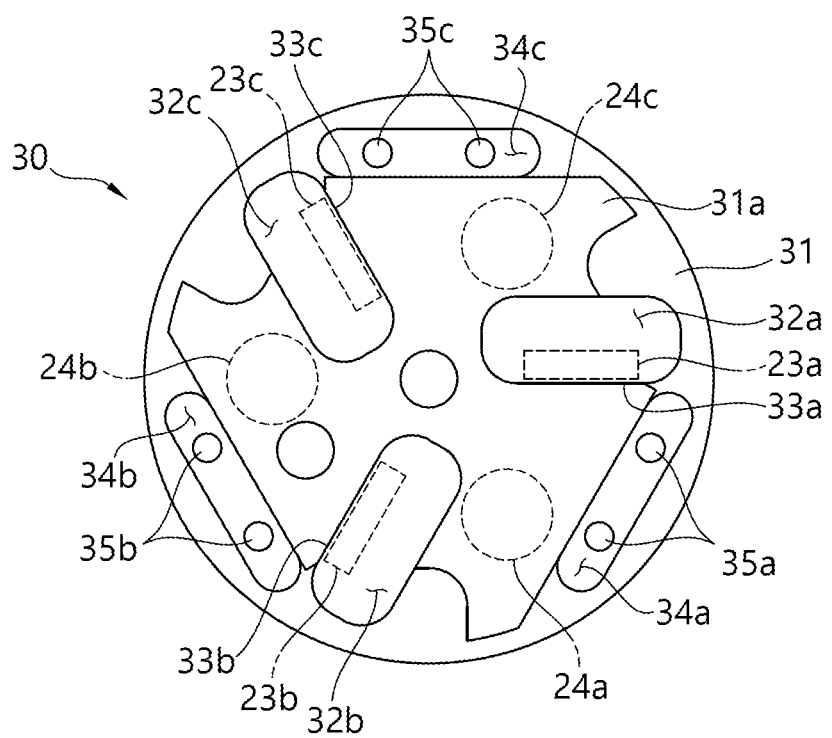

FIG. 1 is an exploded perspective view showing a capacitive sensor according to a first embodiment of the present invention, FIG. 2 is a perspective view showing the bottom surface of an upper block of the capacitive sensor according to the first embodiment of the present invention, and FIG. 3 is a diagram showing the bottom surface of the upper block and the top surface of a lower block of the capacitive sensor according to the first embodiment of the present invention.

As shown in FIG. 1, a capacitive sensor 1 according to the first embodiment of the present invention includes an upper block 10, a lower block 30 and elastic supports 41, 42 and 43.

The upper block 10 includes a housing 11 and a printed circuit board (PCB) 21.

The housing 11 is formed such that it has an accommodating space 14. The accommodating space 14 may accommodate the PCB 21, the elastic supports 41, 42 and 43 and at least a part of the lower block 30.

The housing 11 may be combined with the lower block 30. In this case, the housing 11 may be combined with the lower block 30 in such a manner that the bottom of the housing 11 is in contact with the top of a base plate 31 of the lower block 30 or surrounds the side of the base plate 31.

A plurality of first upper block fixing holes 12a, 12b and 12c and a plurality of first elastic support fixing holes 13a, 13b and 13c may be formed at the top of the housing 11.

The first upper block fixing holes 12a, 12b and 12c are spaces into which fixing members (not shown, screws, for example) for fixing the PCB 21 to the housing 11 are inserted and the first elastic support fixing holes 13a, 13b and 13c are spaces into which fixing members (not shown, screws, for example) for fixing the elastic supports 41, 42 and 43 to the housing 11 are inserted.

A plurality of second upper block fixing holes 21a, 21b and 21c corresponding to the plurality of first upper block fixing holes 12a, 12b and 12c is formed in the PCB 21. The second upper block fixing holes 21a, 21b and 21c are spaces into which fixing members inserted through the first upper block fixing holes 12a, 12b and 12c are inserted.

The PCB 21 is fixed to the housing 11 by fixing members and moves with the housing 11 as one body.

As shown in FIG. 2, a plurality of upper vertical electrodes 23a, 23b and 23c and a plurality of upper horizontal electrodes 24a, 24b and 24c are formed on the bottom surface of the PCB 21.

The upper vertical electrodes 23a, 23b and 23c are formed to protrude from the bottom surface such that they have faces perpendicular to the bottom surface, and the upper horizontal electrodes 24a, 24b and 24c are formed to have faces that are parallel with the bottom surface or are formed on the same plane as the bottom surface.

The plurality of upper vertical electrodes 23a, 23b and 23c may be arranged at an equal interval. Although an example in which three upper vertical electrodes 23a, 23b and 23c are radially arranged at an interval of 120 degrees is illustrated in the present embodiment, four or more upper vertical electrodes may be arranged according to embodiments.

Similarly, the plurality of upper horizontal electrodes 24a, 24b and 24c may also be arranged at an equal interval. Although an example in which three upper horizontal electrodes 24a, 24b and 24c are radially arranged at an interval of 120 degrees is illustrated in the present embodiment, four or more upper horizontal electrodes may be arranged according to embodiments.

In addition, different numbers of upper vertical electrodes 23a, 23b and 23c and upper horizontal electrodes 24a, 24b and 24c may be provided according to an embodiment.

Further, the plurality of upper vertical electrodes 23a, 23b and 23c and the plurality of upper horizontal electrodes 24a, 24b and 24c may be arranged in forms other than a radial form. For example, three electrodes may be arranged to form a triangular shape or four electrodes may be arranged for form a rectangular shape.

Further, a plurality of elastic supports 41, 42 and 43 is provided, as shown in FIG. 1. Although three elastic supports 41, 42 and 43 are illustrated in the present embodiment, the number of elastic supports 41, 42 and 43 may be changed according to embodiments.

The three elastic supports 41, 42 and 43 may have the same structure. One elastic support 41 will be described in detail and description of other elastic supports 42 and 43 will be omitted for convenience.

The elastic support 41 includes a first support column 41a and 41b, an elastic deformation part 41c, and a second support column 41d and 41e.

As shown in FIG. 1, the first support column 41a and 41b includes a first horizontal support rod 41a and a first vertical support rod 41b.

The first horizontal support rod 41a is combined with the housing 11. To this end, second elastic support fixing holes 41f are formed in the first horizontal support rod 41a. The second elastic support fixing holes 41f are formed to correspond to the first elastic support fixing holes 13c, and additional fixing members are inserted into the first elastic support fixing holes 13c and the second elastic support fixing holes 41f to fix the elastic support 41 to the housing 11.

The first vertical support rod 41b is downwardly extended from the center of the first horizontal support rod 41a to connect the first horizontal support rod 41a and the elastic support 41c.

The elastic deformation part 41c is formed to be easily elastically deformed by an external force.

As shown in FIG. 1, the elastic deformation part 41c according to the present embodiment is formed in the shape of a closed loop. The shape of the elastic deformation part 41c may be changed in various manners according to embodiments and detailed description thereof will be described later.

The second support column 41d and 41e includes a second horizontal support rod 41e and a second vertical support rod 41d.

The second horizontal support rod 41e and the second vertical support rod 41d are formed to be symmetrical with the first horizontal support rod 41a and the first vertical support rod 41b on the basis of the elastic deformation part 41c. Third elastic support fixing holes 41g are formed in the second horizontal support rod 41e. The third elastic support fixing holes 41g are spaces into which fixing members (not shown) for fixing the second horizontal support rod 41e to the housing are inserted.

As shown in FIGS. 1 and 3, the lower block 30 includes the base plate 31 and a lower horizontal electrode 31a formed to protrude from the top surface of the base plate 31. The lower horizontal electrode 31a forms the top surface of the lower block 30 in the present embodiment.

Although the lower horizontal electrode 31a is configured as one plate which faces the plurality of upper horizontal electrodes 24a, 24b and 24c in the present embodiment, a plurality of separate lower horizontal electrodes one-to-one corresponding to the plurality of upper horizontal electrodes 24a, 24b and 24c may be configured according to an embodiment.

The lower horizontal electrodes 31a is parallel with the upper horizontal electrodes 24a, 24b and 24c, and at least a part thereof and the upper horizontal electrodes overlap. Accordingly, the upper horizontal electrodes 24a, 24b and 24c serve as capacitors having the air as a dielectric layer along with the lower horizontal electrode 31a, and the capacitors composed of the lower horizontal electrode 31a and the upper horizontal electrodes 24a, 24b and 24c become parts of an electronic circuit formed on the PCB 21. An additional dielectric may be interposed between the upper horizontal electrodes 24a, 24b and 24c and the lower horizontal electrode 31a according to an embodiment.

As shown in FIGS. 2 and 3, the lower block 30 includes a plurality of electrode grooves 32a, 32b and 32c which are recessed from the lower horizontal electrode 31a to the base plate 31. The plurality of electrode grooves 32a, 32b and 32c respectively correspond to the positions of the plurality of upper vertical electrodes 23a, 23b and 23c and are formed to receive at least parts of the plurality of upper vertical electrodes 23a, 23b and 23c. In a state in which the capacitive sensor 1 according to the present embodiment is assembled, the upper vertical electrodes 23a, 23b and 23c are not in contact with the bottom surfaces and sides of the electrode grooves 32a, 32b and 32c.

Sides of the electrode grooves 32a, 32b and 32c, which face the upper vertical electrodes 23a, 23b and 23c, serve as lower vertical electrodes 33a, 33b and 33c. The lower vertical electrodes 33a, 33b and 33c are formed to have faces perpendicular to the lower horizontal electrode 31a corresponding to the top surface of the lower block 30, and at least parts of the lower vertical electrodes 33a, 33b and 33c and the upper vertical electrodes 23a, 23b and 23c overlap.

The upper vertical electrodes 23a, 23b and 23c and the lower vertical electrodes 33a, 33b and 33c serve as capacitors having the air as a dielectric layer, and the capacitors composed of the upper vertical electrodes 23a, 23b and 23c and the lower vertical electrodes 33a, 33b and 33c become parts of an electronic circuit formed on the PCB 21. An additional dielectric may be interposed between the upper vertical electrodes 23a, 23b and 23c and the lower vertical electrodes 33a, 33b and 33c according to an embodiment.

In addition, a plurality of elastic support receiving grooves 34a, 34b and 34c are formed on the base plate 31, as shown in FIG. 1. The elastic support receiving grooves 34a, 34b and 34c are spaces into which the second horizontal support rod 41e is inserted and are formed to correspond to the positions of the elastic supports 41, 42 and 43.

Fourth elastic support fixing holes 35a, 35b and 35c are formed in the elastic support receiving grooves 34a, 34b and 34c. The fourth elastic support fixing holes 35a, 35b and 35c are formed to correspond to the third elastic support fixing holes 41g such that additional fixing members are inserted into the third elastic support fixing holes 41g and the fourth elastic support fixing holes 35a, 35b and 35c to fix the elastic supports 41, 42 and 43 to the lower block 30.

The elastic supports 41, 42 and 43 elastically support the upper block 10 and the lower block 30. Although the first horizontal support rods 41a of the elastic supports 41, 42 and 43 are combined with the housing 11, the PCB 21 is fixed to the housing 11 and thus the entire upper block 10 is elastically supported by the elastic supports 41, 42 and 43 with respect to the lower block 30.

Accordingly, when an external force is applied to the housing 11, the upper block 10 relatively moves with respect to the lower block 30. On the other hand, when an external force is applied to the lower block 30, the lower block 30 relatively moves with respect to the upper block 10.

As the upper block 10 and the lower block 30 relatively move with respect to each other, a distance between the upper vertical electrodes 23a, 23b and 23c and the lower vertical electrodes 33a, 33b and 33c changes and a distance between the upper horizontal electrodes 24a, 24b and 24c and the lower horizontal electrode 31a changes.

Capacitance C of a capacitor is in proportion to a dielectric constant c and an overlap area A and is in inverse proportion to a distance d between electrodes ($C=\varepsilon A/d$).

Accordingly, when the upper block 10 and the lower block 30 relatively move with respect to each other according to an external force and thus a distance between the upper vertical electrodes 23a, 23b and 23c and the lower vertical electrodes 33a, 33b and 33c and a distance between the upper horizontal electrodes 24a, 24b and 24c and the lower horizontal electrode 31a change, capacitances of capacitors formed by the upper vertical electrodes 23a, 23b and 23c and the lower vertical electrodes 33a, 33b and 33c change and capacitances of capacitors formed by the upper horizontal electrodes 24a, 24b and 24c and the lower horizontal electrode 31a change.

The capacitive sensor 1 according to the present embodiment senses information about force components Fx, Fy and Fz and torque components Tx, Ty and Tz which act in three axial directions using varying capacitances.

An electronic circuit composed of the PCB 21, the upper vertical electrodes 23a, 23b and 23c, the lower vertical electrodes 33a, 33b and 33c, the upper horizontal electrodes 24a, 24b and 24c and the lower horizontal electrode 31a may be an electronic circuit which outputs a signal varying in response to changes in capacitances between the upper vertical electrodes 23a, 23b and 23c and the lower vertical electrodes 33a, 33b and 33c and capacitances between the upper horizontal electrodes 24a, 24b and 24c and the lower horizontal electrode 31a.

As an example, the electronic circuit may be an electronic circuit which outputs capacitances between the upper vertical electrodes 23a, 23b and 23c and the lower vertical electrodes 33a, 33b and 33c and capacitances between the upper horizontal electrodes 24a, 24b and 24c and the lower horizontal electrode 31a.

Alternatively, a signal output from the electronic circuit may include information about force components Fx, Fy and Fz and torque components Tx, Ty and Tz which act in three axial directions. In this case, the electronic circuit may include a computation unit which computes the force components Fx, Fy and Fz and the torque components Tx, Ty and Tz that act in three axial directions on the basis of the capacitances between the upper vertical electrodes 23a, 23b and 23c and the lower vertical electrodes 33a, 33b and 33c and the capacitances between the upper horizontal electrodes 24a, 24b and 24c and the lower horizontal electrode 31a.

Hereinafter, a relationship between the force components Fx, Fy and Fz/torque components Tx, Ty and Tz that act in three axial directions and capacitance will be described in detail with reference to FIGS. 4 to 11. FIGS. 4 to 11 are diagrams for describing relative movement between electrodes of the capacitive sensor according to the first embodiment. Components which are not necessary for description are omitted and the shapes of the upper block 10 and the lower block 30 are simplified as circular shapes.

Figure 4:
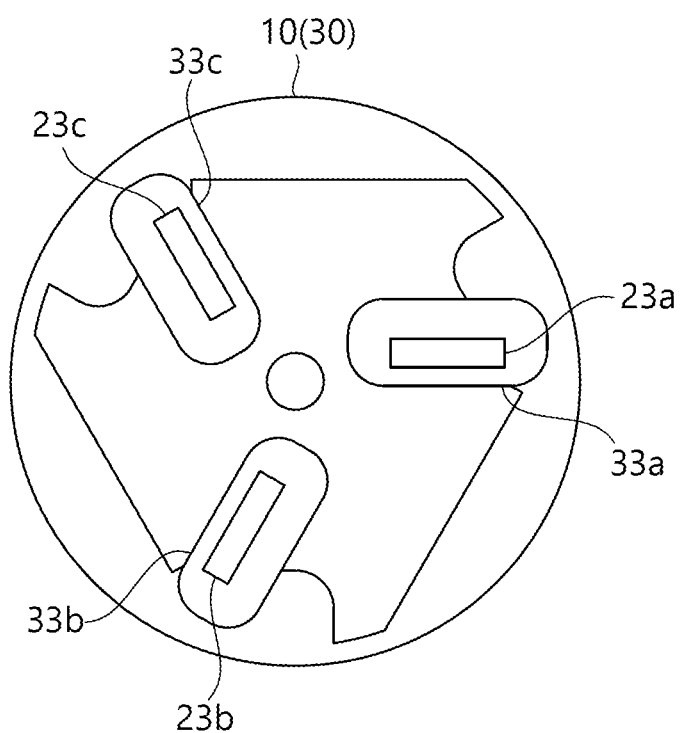
FIG. 4 is a schematic diagram showing initial positions of upper vertical electrodes and lower vertical electrodes of the capacitive sensor according to the first embodiment of the present invention.

FIG. 4 is a schematic diagram showing initial positions of the upper vertical electrodes and the lower vertical electrodes of the capacitive sensor according to the first embodiment of the present invention.

As shown in FIG. 4, the capacitive sensor 1 according to the first embodiment of the present invention includes the three upper vertical electrodes 23a, 23b and 23c disposed at an interval of 120 degrees, and the three lower vertical electrodes 33a, 33b and 33c one-to-one corresponding to the three upper vertical electrodes 23a, 23b and 23c. As described above, the three upper vertical electrodes 23a, 23b and 23c are fixed to the upper block 10 and the three lower vertical electrodes 33a, 33b and 33c are fixed to the lower block 30.

As shown in FIG. 4, the three upper vertical electrodes 23a, 23b and 23c and the three lower vertical electrodes 33a, 33b and 33c are disposed in approximately parallel and maintain a specific distance therebetween in a state in which an external force is not applied to the upper block 10 and the lower block 30.

Hereinafter, the upper vertical electrode 23a parallel with the X axis will be referred to as a first upper vertical electrode, the upper vertical electrode 23b positioned at +120 degrees from the first upper vertical electrode 23a will be referred to as a second upper vertical electrode, and the upper vertical electrode 23c positioned at −120 degrees from the first upper vertical electrode 23a will be referred to as a third upper vertical electrode in FIG. 4 for convenience of description.

In addition, the lower vertical electrode 33a facing the first upper vertical electrode 23a will be referred to as a first lower vertical electrode, the lower vertical electrode 33b facing the second upper vertical electrode 23b will be referred to as a second lower vertical electrode, and the lower vertical electrode 33c facing the third upper vertical electrode 23c will be referred to as a third lower vertical electrode.

Next, description will be made on the assumption that the lower block 30 is fixed and the upper block 10 moves with respect to the lower block 30.

Figure 5:
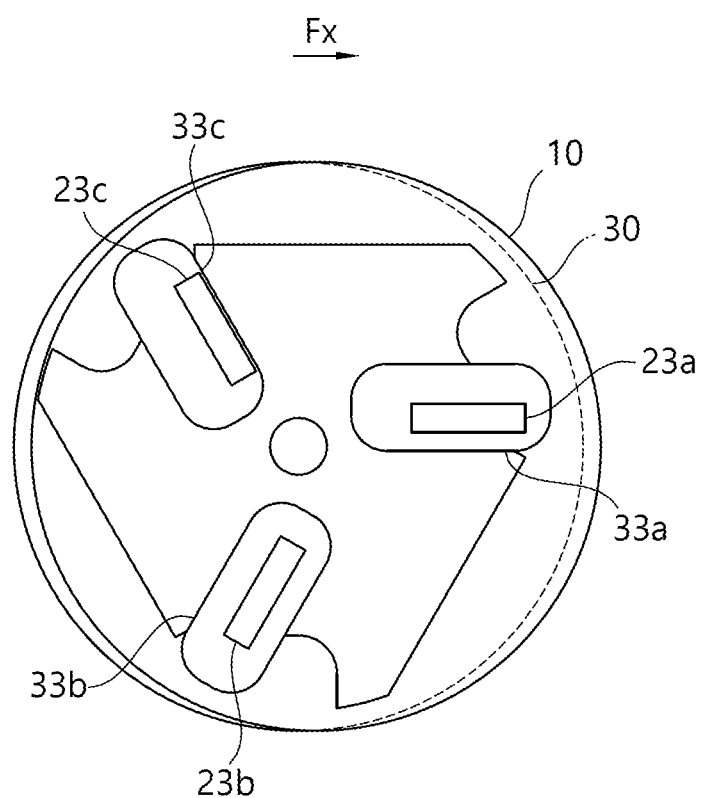
FIG. 5 is a schematic diagram showing changes in the positions of the upper vertical electrodes and the lower vertical electrodes according to a force Fx in an X direction applied to the upper block of the capacitive sensor according to the first embodiment of the present invention.

FIG. 5 is a schematic diagram showing changes in the positions of the upper vertical electrodes and the lower vertical electrodes according to a force Fx in the X direction applied to the upper block of the capacitive sensor according to the first embodiment of the present invention.

When the X-direction force Fx is applied to the upper block 10, the upper block 10 slightly moves in the X direction, as shown in FIG. 5. The distance between the first upper vertical electrode 23a and the first lower vertical electrode 33a does not change, the distance between the second upper vertical electrode 23b and the second lower vertical electrode 33b decreases and the distance between the third upper vertical electrode 23c and the third lower vertical electrode 33c increases according to movement of the upper block 10.

Accordingly, capacitance C1 between the first upper vertical electrode 23a and the first lower vertical electrode 33a hardly changes (the capacitance may slightly change when the overlap area between the first upper vertical electrode 23a and the first lower vertical electrode 33a decreases), capacitance C2 between the second upper vertical electrode 23b and the second lower vertical electrode 33b increases and capacitance C3 between the third upper vertical electrode 23c and the third lower vertical electrode 33c decreases.

As the X-direction force Fx applied to the upper block 10 increases, the distance between the second upper vertical electrode 23b and the second lower vertical electrode 33b further decreases and the distance between the third upper vertical electrode 23c and the third lower vertical electrode 33c further increases.

Accordingly, Fx is in proportion to the capacitance C2 between the second upper vertical electrode 23b and the second lower vertical electrode 33b, whereas Fx is in inverse proportion to the capacitance C3 between the third upper vertical electrode 23c and the third lower vertical electrode 33c.

The force Fx acting in the X direction can be detected using this relationship.

Figure 6:
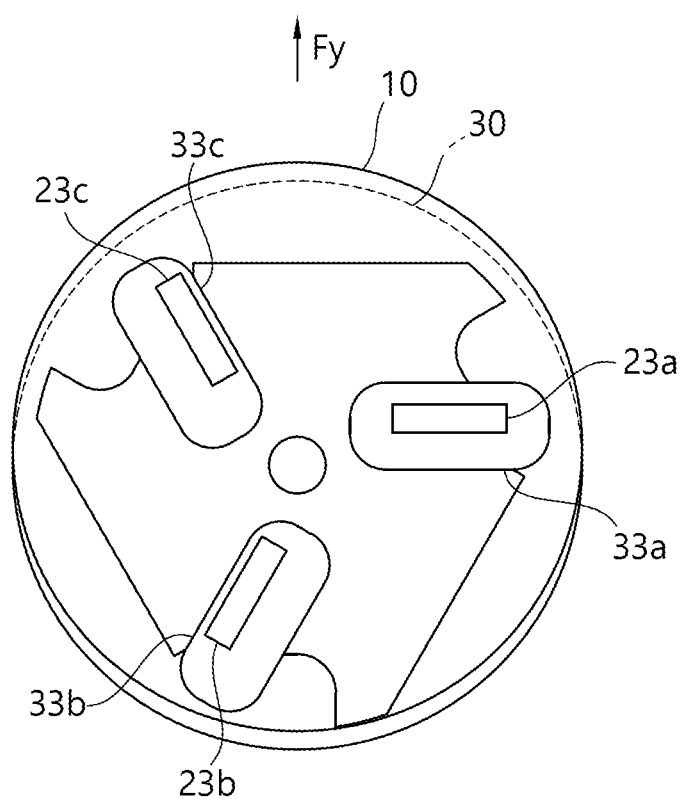
FIG. 6 is a schematic diagram showing changes in the positions of the upper vertical electrodes and the lower vertical electrodes according to a force Fy in a Y direction applied to the upper block of the capacitive sensor according to the first embodiment of the present invention.

FIG. 6 is a schematic diagram showing changes in the positions of the upper vertical electrodes and the lower vertical electrodes according to a force Fy in a Y direction applied to the upper block of the capacitive sensor according to the first embodiment of the present invention.

When the Y-direction force Fy is applied to the upper block 10, the upper block 10 slightly moves in the Y direction, as shown in FIG. 6. The distance between the first upper vertical electrode 23a and the first lower vertical electrode 33a increases, the distance between the second upper vertical electrode 23b and the second lower vertical electrode 33b decreases and the distance between the third upper vertical electrode 23c and the third lower vertical electrode 33c decreases according to movement of the upper block 10.

Accordingly, the capacitance C1 between the first upper vertical electrode 23a and the first lower vertical electrode 33a decreases, the capacitance C2 between the second upper vertical electrode 23b and the second lower vertical electrode 33b increases and the capacitance C3 between the third upper vertical electrode 23c and the third lower vertical electrode 33c increases.

As the Y-direction force Fy applied to the upper block 10 increases, the distance between the first upper vertical electrode 23a and the first lower vertical electrode 33a further increases, the distance between the second upper vertical electrode 23b and the second lower vertical electrode 33b further decreases and the distance between the third upper vertical electrode 23c and the third lower vertical electrode 33c further decreases.

Accordingly, Fy is in inverse proportion to the capacitance C1 between the first upper vertical electrode 23a and the first lower vertical electrode 33a, Fy is in proportion to the capacitance C2 between the second upper vertical electrode 23b and the second lower vertical electrode 33b, and Fy is in proportion to the capacitance C3 between the third upper vertical electrode 23c and the third lower vertical electrode 33c.

The force Fy acting in the Y direction can be detected using this relationship.

Figure 7:
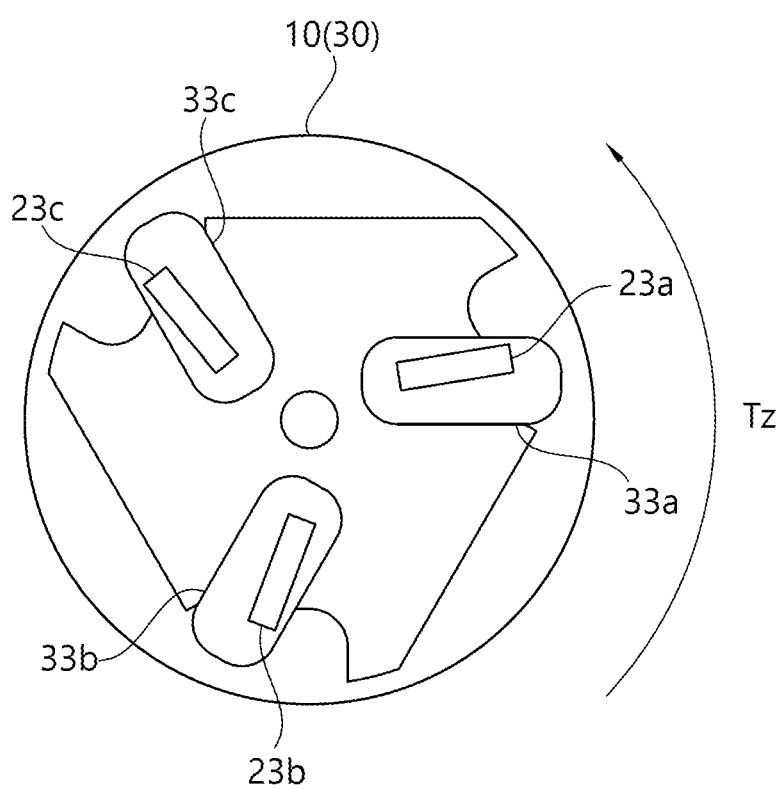
FIG. 7 is a schematic diagram showing changes in the positions of the upper vertical electrodes and the lower vertical electrodes according to a torque Tz in a Z direction applied to the upper block of the capacitive sensor according to the first embodiment of the present invention.

FIG. 7 is a schematic diagram showing changes in the positions of the upper vertical electrodes and the lower vertical electrodes according to a torque Tz in a Z direction applied to the upper block of the capacitive sensor according to the first embodiment of the present invention.

When the Z-direction torque Tz is applied to the upper block 10, the upper block 10 rotates in the Z direction, as shown in FIG. 7. The distance between the first upper vertical electrode 23a and the first lower vertical electrode 33a, the distance between the second upper vertical electrode 23b and the second lower vertical electrode 33b, and the distance between the third upper vertical electrode 23c and the third lower vertical electrode 33c increase according to rotation of the upper block 10.

Accordingly, the capacitance C1 between the first upper vertical electrode 23a and the first lower vertical electrode 33a, the capacitance C2 between the second upper vertical electrode 23b and the second lower vertical electrode 33b, and the capacitance C3 between the third upper vertical electrode 23c and the third lower vertical electrode 33c decrease.

As the Z-direction torque Tz applied to the upper block 10 increases, the distance between the first upper vertical electrode 23a and the first lower vertical electrode 33a, the distance between the second upper vertical electrode 23b and the second lower vertical electrode 33b, and the distance between the third upper vertical electrode 23c and the third lower vertical electrode 33c further increase.

Accordingly, Tz is in inverse proportion to the capacitance C1 between the first upper vertical electrode 23a and the first lower vertical electrode 33a, the capacitance C2 between the second upper vertical electrode 23b and the second lower vertical electrode 33b, and the capacitance C3 between the third upper vertical electrode 23c and the third lower vertical electrode 33c.

The torque Tz acting in the Z direction can be detected using this relationship.

Figure 8:
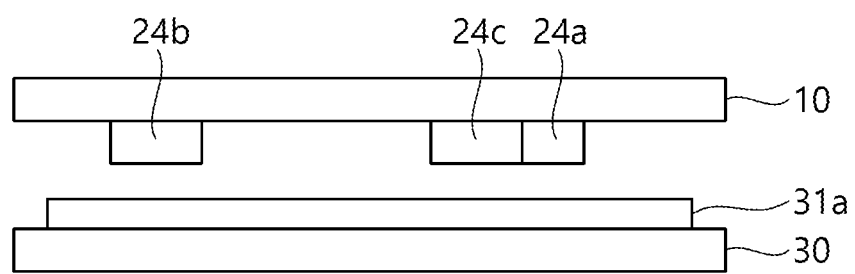
FIG. 8 is a schematic diagram showing initial positions of upper horizontal electrodes and a lower horizontal electrode of the capacitive sensor according to the first embodiment of the present invention.

FIG. 8 is a schematic diagram showing initial positions of the upper horizontal electrodes and the lower horizontal electrode of the capacitive sensor according to the first embodiment of the present invention.

As shown in FIG. 8, the capacitive sensor 1 according to the first embodiment of the present invention includes the three upper horizontal electrodes 24a, 24b and 24c disposed on the lower surface of the upper block 10. As shown in FIG. 3, the three upper horizontal electrodes 24a, 24b and 24c are disposed at an interval of 120 degrees. In addition, the lower horizontal electrode 31a is formed to protrude from the base plate 31 of the lower block 30.

As shown in FIG. 8, the three upper horizontal electrodes 24a, 24b and 24c and the lower horizontal electrode 31a are disposed in approximately parallel and maintain a specific distance therebetween in a state in which an external force is not applied to the upper block 10 and the lower block 30.

Hereinafter, the rightmost upper horizontal electrode 24a will be referred to as a first upper horizontal electrode, the leftmost upper horizontal electrode 24b will be referred to as a second upper horizontal electrode, and the upper horizontal electrode 24c positioned at the center will be referred to as a third upper horizontal electrode in FIG. 8 for convenience of description.

Figure 9:
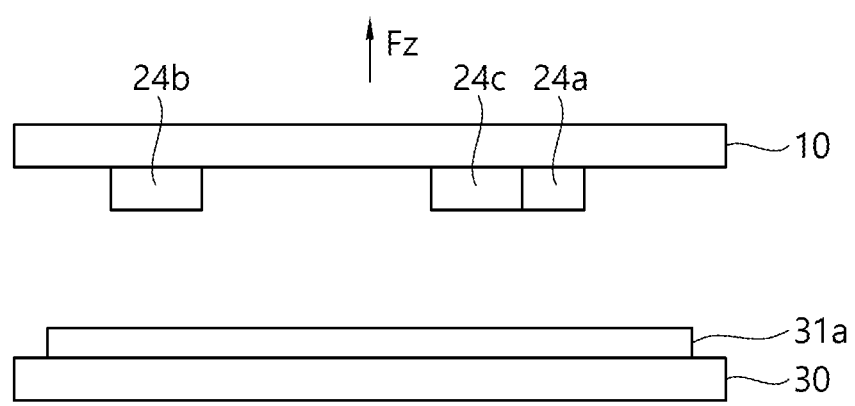
FIG. 9 is a schematic diagram showing changes in the positions of the upper horizontal electrodes and the lower horizontal electrode according to a force Fz in the Z direction applied to the upper block of the capacitive sensor according to the first embodiment of the present invention.

FIG. 9 is a schematic diagram showing changes in the positions of the upper horizontal electrodes and the lower horizontal electrode according to a force Fz in the Z direction applied to the upper block of the capacitive sensor according to the first embodiment of the present invention.

When the Z-direction force Fz is applied to the upper block 10, the upper block 10 slightly moves in the Z direction, as shown in FIG. 9. The distance between the three upper horizontal electrodes 24a, 24b and 24c and the lower horizontal electrode 31a increases according to movement of the upper block 10.

Accordingly, all of capacitance C4 between the first upper horizontal electrode 24a and the lower horizontal electrode 31a, capacitance C5 between the second upper horizontal electrode 24b and the lower horizontal electrode 31a, and capacitance C6 between the third upper horizontal electrode 24c and the lower horizontal electrode 31a decrease.

As the Z-direction force Fz applied to the upper block 10 increases, the distance between the three upper horizontal electrodes 24a, 24b and 24c and the lower horizontal electrode 31a further increases.

Accordingly, Fz is in inverse proportion to the capacitance C4 between the first upper horizontal electrode 24a and the lower horizontal electrode 31a, the capacitance C5 between the second upper horizontal electrode 24b and the lower horizontal electrode 31a, and the capacitance C6 between the third upper horizontal electrode 24c and the lower horizontal electrode 31a.

The force Fz acting in the Z direction can be detected using this relationship.

Figure 10:
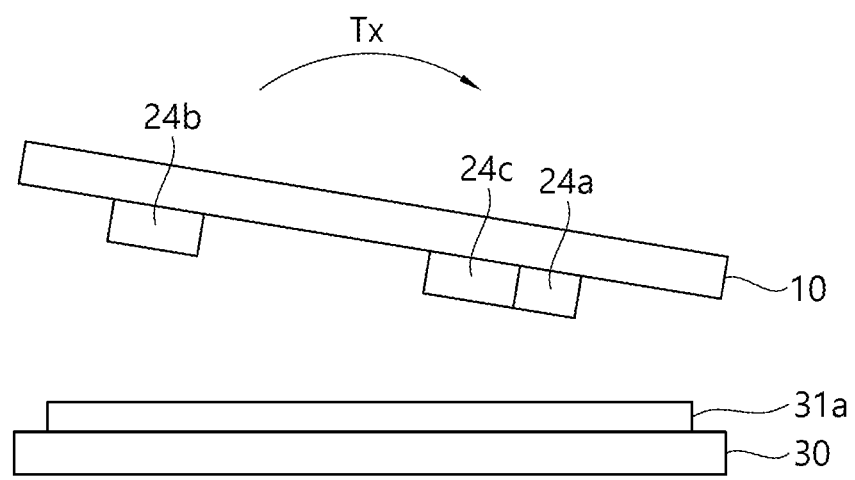
FIG. 10 is a schematic diagram showing changes in the positions of the upper horizontal electrodes and the lower horizontal electrode according to a torque Tx in the X direction applied to the upper block of the capacitive sensor according to the first embodiment of the present invention.

FIG. 10 is a schematic diagram showing changes in the positions of the upper horizontal electrodes and the lower horizontal electrode according to a torque Tx in the X direction applied to the upper block of the capacitive sensor according to the first embodiment of the present invention.

When the X-direction torque Tx is applied to the upper block 10, the upper block 10 rotates in the X direction, as shown in FIG. 10. The distance between the first and third upper horizontal electrodes 24a and 24c and the lower horizontal electrode 31a decreases and the distance between the second upper horizontal electrode 24b and the lower horizontal electrode 31a increases according to rotation of the upper block 10.

Accordingly, the capacitance C4 between the first upper horizontal electrode 24a and the lower horizontal electrode 31a and the capacitance C6 between the third upper horizontal electrode 24c and the lower horizontal electrode 31a increase, whereas the capacitance C5 between the second upper horizontal electrode 24b and the lower horizontal electrode 31a decreases.

As the X-direction torque Tx applied to the upper block 10 increases, the distance between the first and third upper horizontal electrodes 24a and 24c and the lower horizontal electrode 31a further decreases and the distance between the second upper horizontal electrode 24b and the lower horizontal electrode 31a further increases.

Accordingly, Tx is in proportion to the capacitance C4 between the first upper horizontal electrode 24a and the lower horizontal electrode 31a and the capacitance C6 between the third upper horizontal electrode 24c and the lower horizontal electrode 31a, whereas Tx is in inverse proportion to the capacitance C5 between the second upper horizontal electrode 24b and the lower horizontal electrode 31a.

The torque Tx acting in the X direction can be detected using this relationship.

Figure 11:
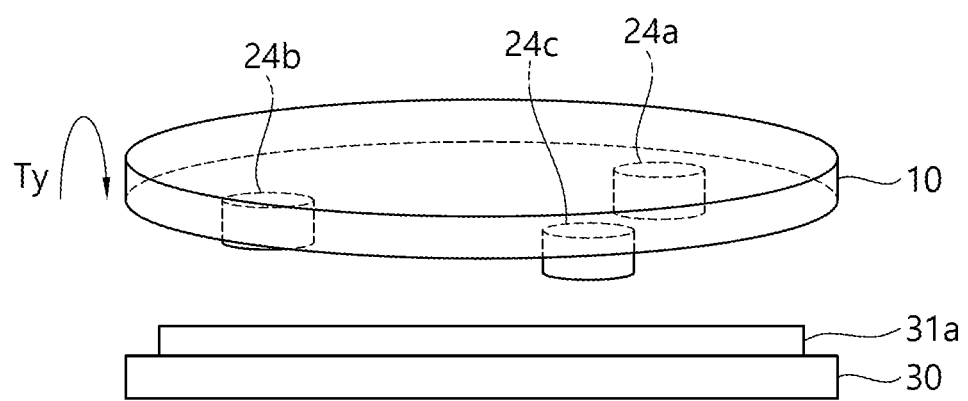
FIG. 11 is a schematic diagram showing changes in the positions of the upper horizontal electrodes and the lower horizontal electrode according to a torque Ty in the Y direction applied to the upper block of the capacitive sensor according to the first embodiment of the present invention.

FIG. 11 is a schematic diagram showing changes in the positions of the upper horizontal electrodes and the lower horizontal electrode according to a torque Ty in the Y direction applied to the upper block of the capacitive sensor according to the first embodiment of the present invention.

When the Y-direction torque Ty is applied to the upper block 10, the upper block 10 rotates in the Y direction, as shown in FIG. 11.

Since the second upper horizontal electrode 24b is disposed adjacent to the Y axis, the distance between the second upper horizontal electrode 24b and the lower horizontal electrode 31a does not considerably change.

However, the distance between the first upper horizontal electrode 24a and the lower horizontal electrode 31a increases and the distance between the third upper horizontal electrode 24c and the lower horizontal electrode 31a decreases.

Accordingly, the capacitance C5 between the second upper horizontal electrode 24b and the lower horizontal electrode 31a hardly changes, the capacitance C4 between the first upper horizontal electrode 24a and the lower horizontal electrode 31a decreases and the capacitance C6 between the third upper horizontal electrode 24c and the lower horizontal electrode 31a increases.

As the Y-direction torque Ty applied to the upper block 10 increases, the distance between the first upper horizontal electrode 24a and the lower horizontal electrode 31a further increases and the distance between the third upper horizontal electrode 24c and the lower horizontal electrode 31a further decreases.

Accordingly, Ty is in inverse proportion to the capacitance C4 between the first upper horizontal electrode 24a and the lower horizontal electrode 31a, whereas Ty is in proportion to the capacitance C6 between the third upper horizontal electrode 24c and the lower horizontal electrode 31a.

The torque Ty acting in the Y direction can be detected using this relationship.

Methods of detecting the force components Fx, Fy and Fz and the torque components Tx, Ty and Tz which act in three axial directions may be varied according to relative changes in the positions of the upper vertical electrodes 23a, 23b and 23c, the lower vertical electrodes 33a, 33b and 33c and the upper horizontal electrodes 24a, 24b and 24c with respect to the X, Y and Z axes.

Hereinafter, a capacitive sensor according to a second embodiment of the present invention will be described. The same reference numerals are used for parts similar to those in the first embodiment and description of redundant parts in the first and second embodiments is omitted for convenience of description.

Figure 12:
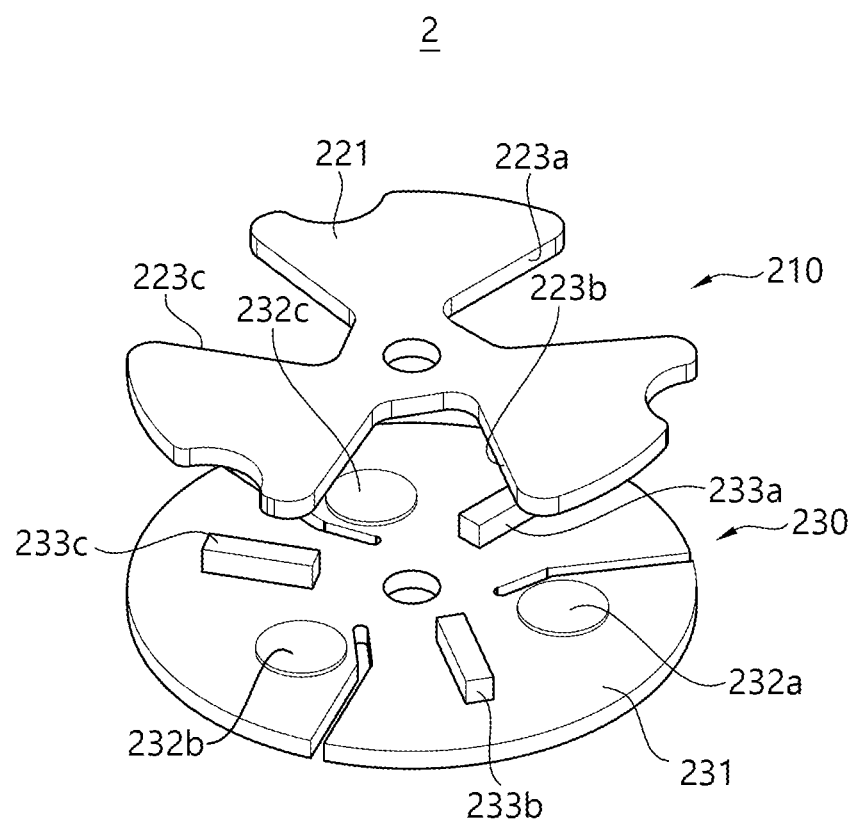
FIG. 12 is an exploded perspective view schematically showing an upper block and a lower block of a capacitive sensor according to a second embodiment of the present invention.
Figure 13:
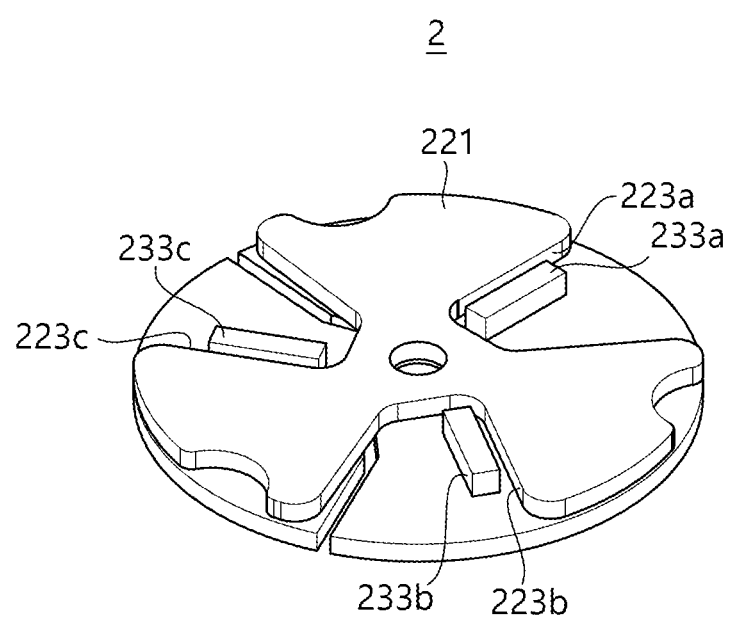
FIG. 13 is a perspective view showing a state in which the upper block and the lower block of the capacitive sensor according to the second embodiment of the present invention have been assembled.

FIG. 12 is an exploded perspective view schematically showing an upper block and a lower block of the capacitive sensor according to the second embodiment of the present invention and FIG. 13 is a perspective view showing a state in which the upper block and the lower block of the capacitive sensor according to the second embodiment of the present invention have been assembled.

As shown in FIG. 12, the upper block 210 of the capacitive sensor 2 according to the second embodiment of the present invention has a shape similar to that of the lower horizontal electrode 31a of the first embodiment.

The upper block 210 includes a plate 221 that forms the body, the side of the plate 221 serves as upper vertical electrodes 223a, 223b and 223c and the bottom surface of the plate 221 serves as an upper horizontal electrode. That is, the upper vertical electrodes 223a, 223b and 223c are formed on the side of the upper block 210 in the present embodiment.

On the other hand, the lower block 230 includes a plurality of lower vertical electrodes 233a, 233b and 233c and a plurality of lower horizontal electrodes 232a, 232b and 232c which are formed to protrude from the top surface of a base plate 231.

As shown in FIG. 13, the plurality of lower horizontal electrodes 232a, 232b and 232c and the lower surface of the plate 221 overlap. The plurality of lower horizontal electrodes 232a, 232b and 232c are not in contact with the lower surface of the plate 221.

In addition, the plurality of lower vertical electrodes 233a, 233b and 233c are disposed to be separated from the side of the plate 221. Portions of the side of the plate 221, which face the lower vertical electrodes 233a, 233b and 233c, serve as the upper vertical electrodes 223a, 223b and 223c.

Although not shown, the upper block 210 of the capacitive sensor 2 according to the present embodiment may also include the housing 11 which surrounds the top and side of the plate 221 or the capacitive sensor 2 may further include the elastic supports 41, 42 and 43 which elastically support the upper block 210 and the lower block 230 similarly to the above-described capacitive sensor 1 according to the first embodiment. In this case, the elastic supports 41, 42 and 43 may be configured to elastically support the upper block 210 and the lower block 230 such that the upper block 210 and the lower block 230 can be relatively moved by external forces Fx, Fy, Fz, Tx, Ty and Tz.

The capacitive sensor 2 according to the present embodiment can also detect force components Fx, Fy and Fz and torque components Tx, Ty and Tz which act in three axial directions using changes in distances/capacitances between the upper vertical electrodes 223a, 223b and 223c, the lower vertical electrodes 233a, 233b and 233c, the upper horizontal electrode and the lower horizontal electrodes 232a, 232b and 232c according to external forces.

As a modified example of the capacitive sensor 2 according to the second embodiment, the upper block 210 and the lower block 230 may be arranged such that the positions thereof are reversed. That is, the lower block 230 in FIGS. 12 and 13 is reversed 180 degrees to serve as an upper block and the upper block 210 is reversed 180 degrees to serve as a lower block.

In this case, the plurality of lower vertical electrodes 233a, 233b and 233c and the plurality of lower horizontal electrodes 232a, 232b and 232c shown in FIG. 12 serve as upper vertical electrodes and upper horizontal electrodes. In addition, the upper vertical electrodes 223a, 223b and 223c formed on the side of the plate 221 serves as lower vertical electrodes and one side of the plate 221 serves as a lower horizontal electrode.

That is, in the capacitive sensor according to the modified example, the upper vertical electrodes are formed to protrude from the bottom surface of the upper block and the lower vertical electrodes are formed on the side of the lower block.

Hereinafter, a capacitive sensor according to a third embodiment of the present invention will be described. The same reference numerals are used for parts similar to those in the first embodiment and description of redundant parts in the first and third embodiments is omitted for convenience of description.

Figure 14:
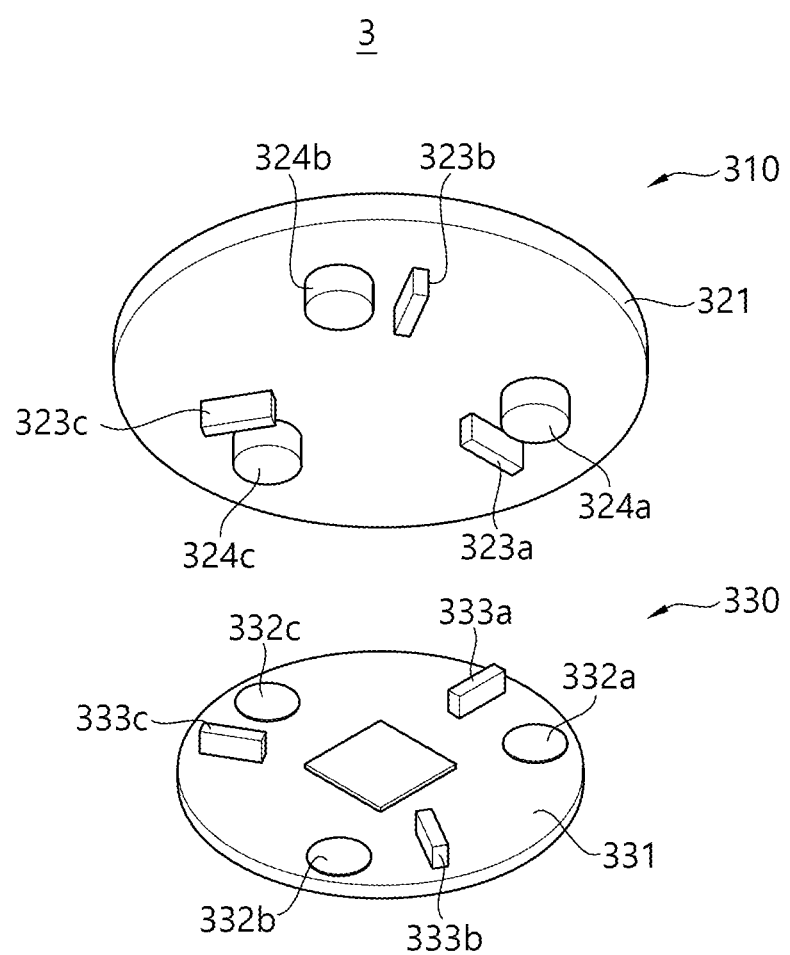
FIG. 14 is an exploded perspective view schematically showing the bottom surfaces of an upper block and a lower block of a capacitive sensor according to a third embodiment of the present invention.
Figure 15:
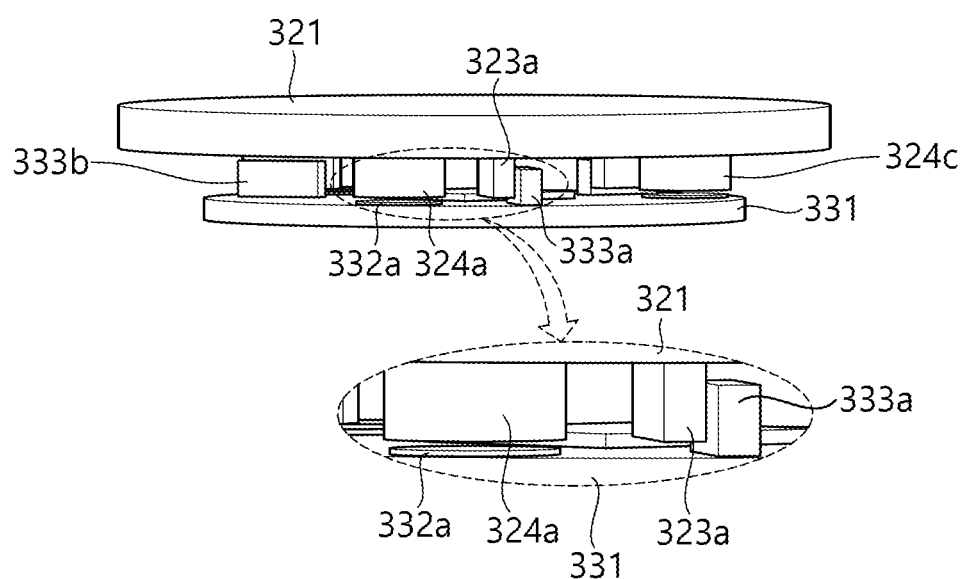
FIG. 15 is a perspective view showing a state in which the upper block and the lower block of the capacitive sensor according to the third embodiment of the present invention have been assembled.

FIG. 14 is an exploded perspective view schematically showing an upper block and a lower block of the capacitive sensor according to the third embodiment of the present invention and FIG. 15 is a perspective view showing a state in which the upper block and the lower block of the capacitive sensor according to the third embodiment of the present invention have been assembled.

As shown in FIG. 14, the upper block 310 of the capacitive sensor 3 according to the third embodiment of the present invention includes a plurality of upper vertical electrodes 323a, 323b and 323c and a plurality of upper horizontal electrodes 324a, 324b and 324c formed to protrude from the bottom surface of an upper plate 321.

In addition, the lower block 330 includes a plurality of lower vertical electrodes 333a, 333b and 333c and a plurality of lower horizontal electrodes 332a, 332b and 332c formed to protrude from the top surface of a base plate 331.

As shown in FIG. 15, the plurality of upper vertical electrodes 323a, 323b and 323c and the plurality of lower vertical electrodes 333a, 333b and 333c partially overlap and are disposed to face each other without being in contact with each other. In addition, the plurality of upper vertical electrodes 323a, 323b and 323c are not in contact with the base plate 331 and the plurality of lower vertical electrodes 333a, 333b and 333c are not in contact with the upper plate 321.

Further, the plurality of upper horizontal electrodes 324a, 324b and 324c are positioned above the plurality of lower horizontal electrodes 332a, 332b and 332c, and the upper horizontal electrodes 324a, 324b and 324c and the lower horizontal electrodes 332a, 332b and 332c are disposed to overlap without being in contact with each other.

Although not shown, the upper block 310 of the capacitive sensor 3 according to the present embodiment may also include the housing 11 which surrounds the top and side of the upper plate 321 or the capacitive sensor 3 may further include the elastic supports 41, 42 and 43 which elastically support the upper block 310 and the lower block 330 similarly to the above-described capacitive sensor 1 according to the first embodiment. In this case, the elastic supports 41, 42 and 43 may be configured to elastically support the upper block 310 and the lower block 330 such that the upper block 310 and the lower block 330 can be relatively moved by external forces Fx, Fy, Fz, Tx, Ty and Tz.

The capacitive sensor 3 according to the present embodiment can also detect force components Fx, Fy and Fz and torque components Tx, Ty and Tz which act in three axial directions using changes in distances/capacitances between the upper vertical electrodes 323a, 323b and 323c, the lower vertical electrodes 333a, 333b and 333c, the upper horizontal electrodes 324a, 324b and 324c and the lower horizontal electrodes 332a, 332b and 332c according to external forces.

Hereinafter, a capacitive sensor according to a fourth embodiment of the present invention will be described. The same reference numerals are used for parts similar to those in the third embodiment and description of redundant parts in the first and fourth embodiments is omitted for convenience of description.

Figure 16:
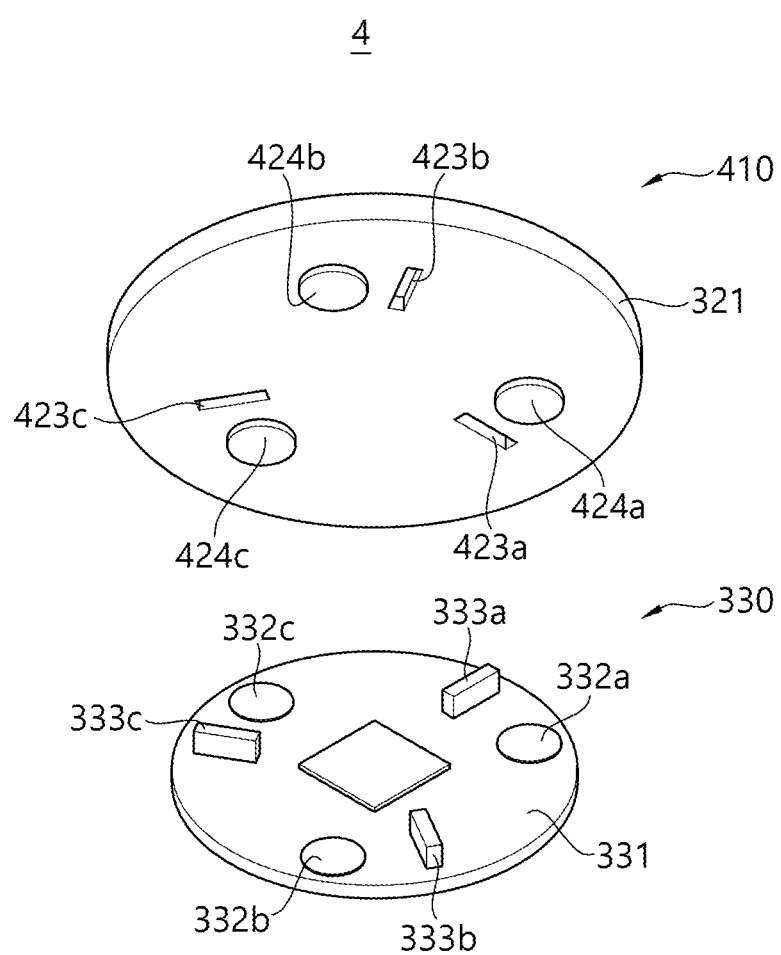
FIG. 16 is an exploded perspective view schematically showing the bottom surfaces of an upper block and a lower block of a capacitive sensor according to a fourth embodiment of the present invention.

FIG. 16 is an exploded perspective view schematically showing the lower surfaces of an upper block and a lower block of the capacitive sensor according to the fourth embodiment of the present invention.

As shown in FIG. 16, the capacitive sensor 4 according to the fourth embodiment of the present invention differs from the above-described capacitive sensor 3 according to the third embodiment with respect to the shape of the upper block 310.

In the capacitive sensor 4 according to the fourth embodiment of the present invention, a plurality of upper vertical electrodes 423a, 423b and 423c are formed to be recessed from the lower surface of an upper plate 321.

Accordingly, parts of a plurality of lower vertical electrodes 333a, 333b and 333c formed in the lower block 330 are inserted into the upper block 410 to face the upper vertical electrodes 423a, 423b and 423c.

When parts of the lower vertical electrodes 333a, 333b and 333c are inserted into the upper block 410, the distance between the upper block 410 and the lower block 330 decreases and thus the length of protrusion of a plurality of upper horizontal electrodes 424a, 424b and 424c decreases compared to that in the third embodiment or the upper horizontal electrodes 424a, 424b and 424c may be formed on the same plane as the lower surface of the upper plate 321.

Hereinafter, elastic supports according to other embodiments of the present invention will be described.

FIGS. 17 to 22 are front views showing elastic supports according to other embodiments of the present invention.

Figure 17:
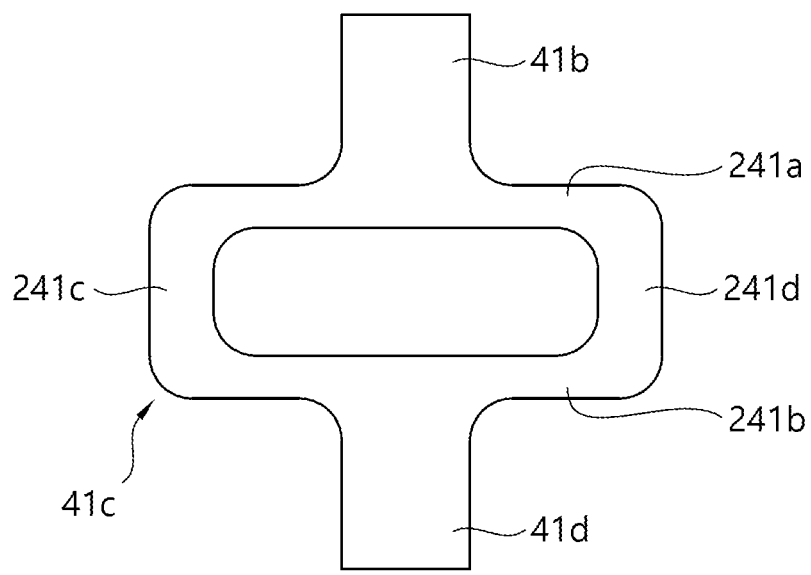
FIGS. 17 to 22 are front views showing elastic supports according to other embodiments of the present invention.

An elastic support 241 shown in FIG. 17 has a structure in which the first horizontal support rod 41a and the second horizontal support rod 41e are omitted compared to the elastic supports 41, 42 and 43 of the above-described capacitive sensor 1 according to the first embodiment.

As shown in FIG. 17, the elastic deformation part 41c of the elastic support 241 has a closed loop shape.

More specifically, the elastic deformation part 41c includes a pair of horizontal beams 241a and 241b separated from each other, and a pair of vertical beams 241c and 241d which connect the horizontal beams 241a and 241d.

In addition, the vertical beams 241c and 241d are disposed on different axial lines from the first vertical support rod 41b and the second vertical support rod 41d such that the elastic deformation part 41c has elastic force according to an external force.

To this end, in the elastic supports 41, 42, 43 and 241 shown in FIGS. 1 and 17, the pair of vertical beams 241c and 241d is formed on both sides of the pair of horizontal beams 241a and 241b, and the first vertical support rod 41b and the second vertical support rod 41d are upwardly and downwardly extended from the centers of the horizontal beams 241a and 241b.

Although the elastic supports 41 and 241 having the elastic deformation part 41c in a closed loop shape are shown in FIGS. 1 and 17, one of the vertical beams 241c and 241d may be omitted and thus an elastic deformation part having a loop shape with the left or right side opened may be used according to an embodiment.

Figure 18:
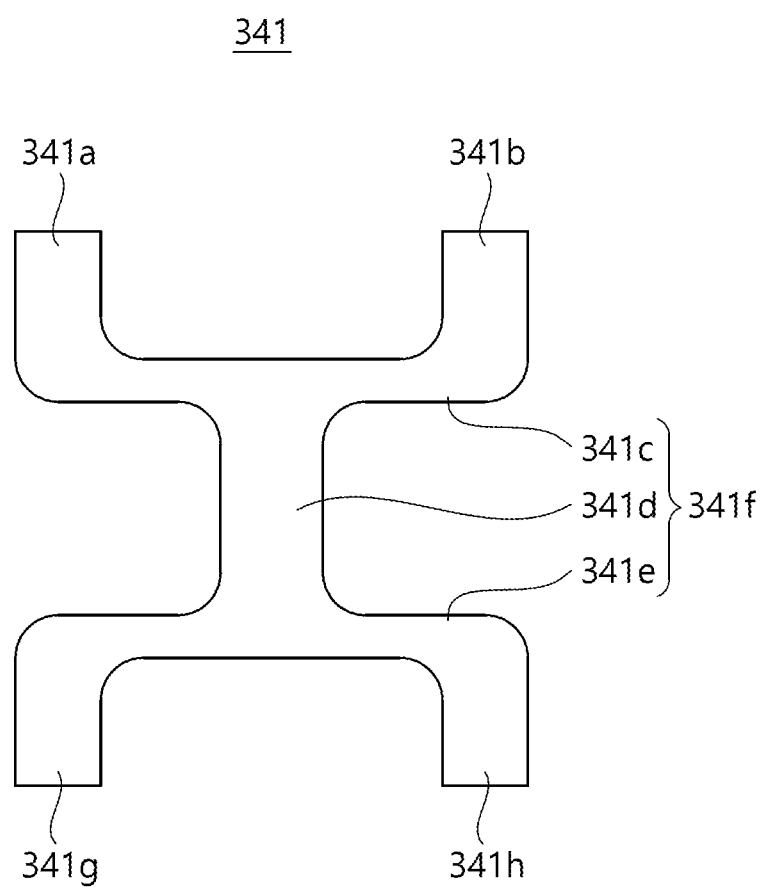

An elastic deformation part 341f of an elastic support 341 shown in FIG. 18 includes a pair of horizontal beams 341c and 341e separated from each other and a vertical beam 341d which connects the horizontal beams 341c and 341e.

The elastic deformation part 41c of the elastic support 241 shown in FIG. 17 is formed such that the vertical beams 241c and 241d connect both sides of the horizontal beams 241a and 241b, whereas the elastic deformation part 341c of the elastic support 341 shown in FIG. 18 is formed such that the vertical beam 341d connects the centers of the horizontal beams 341c and 341e.

In addition, a pair of first vertical support rods 341a and 341b constituting a first support column is upwardly extended from both ends of the horizontal beam 341c and a pair of second vertical support rods 341g and 341h constituting a second support column is downwardly extended from both ends of the horizontal beam 341e.

In the elastic support 341 shown in FIG. 18, the first vertical support rods 341a and 341b and the second vertical support rods 341g and 341h are also disposed on different axial lines from the vertical beam 341d.

Figure 19:
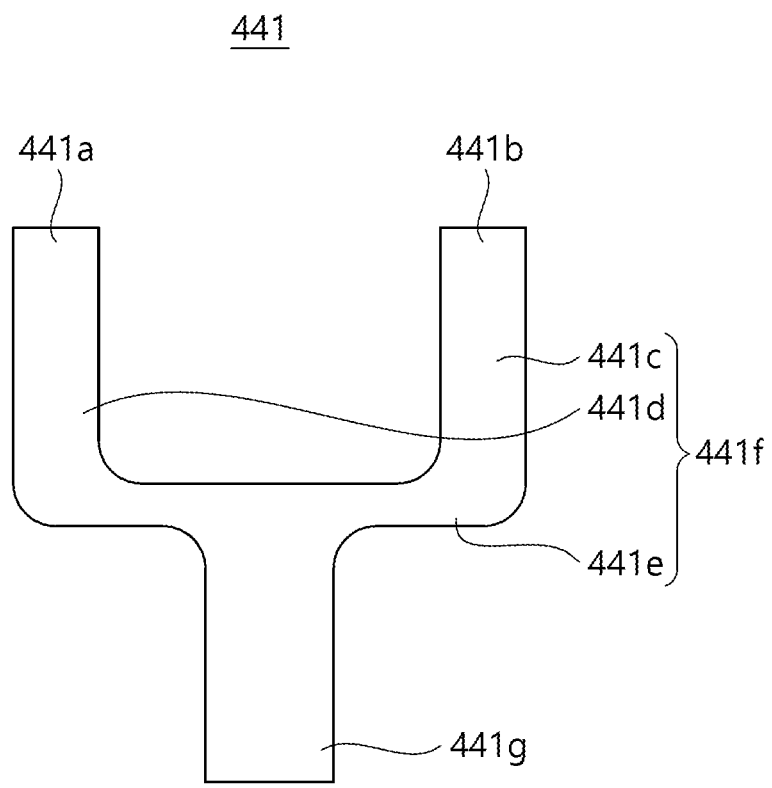

An elastic support 441 shown in FIG. 19 includes an elastic deformation part 441f having an approximate Y shape.

More specifically, the elastic deformation part 441f includes a pair of vertical beams 441c and 441d separated from each other and a horizontal beam 441e which connects the vertical beams 441c and 441d.

First vertical support rods 441a and 441b constituting a first support column are respectively upwardly extended from the vertical beams 441c and 441d and a second vertical support rod 441g constituting a second support column is downwardly extended from the horizontal beam 441e.

The second vertical support rod 441g is disposed on a different axial line from the vertical beams 441c and 441d.

Figure 20:
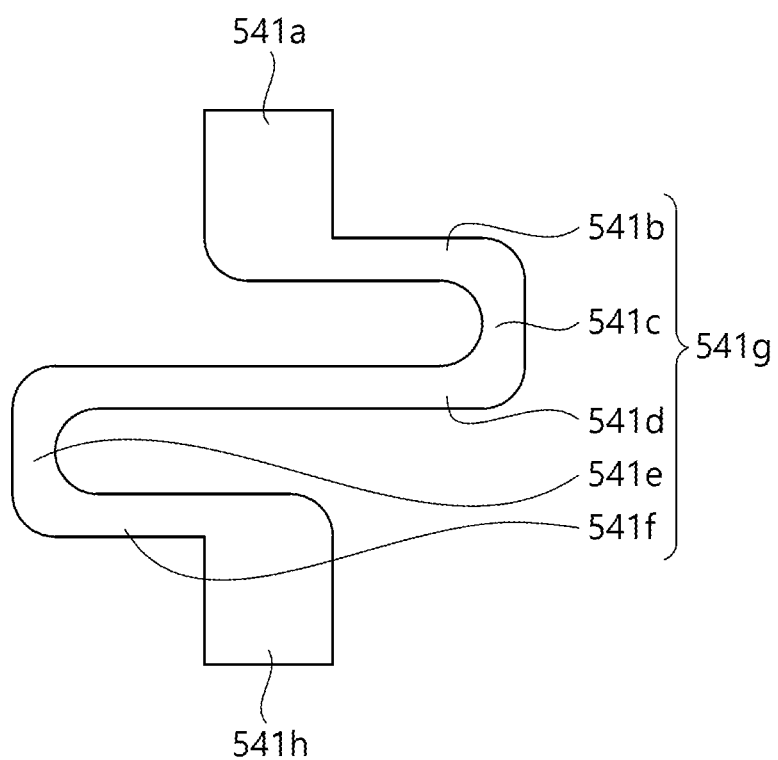

An elastic support 541 shown in FIG. 20 includes an elastic deformation part 541g formed in a zigzag shape.

More specifically, the elastic deformation part 541g includes a plurality of separated horizontal beams 541b, 541d and 541f and a plurality of vertical beams 541c and 541e which connect the plurality of horizontal beams 541b, 541d and 541f.

The plurality of vertical beams 541c and 541e include the first vertical beam 541c which connects one side of the first horizontal beam 541b to one side of the second horizontal beam 541d, and the second vertical beam 541e which connects the other side of the second horizontal beam 541d to the other side of the third horizontal beam 541f.

The first vertical beam 541c and the second vertical beam 541e are disposed on different axial lines to induce the elastic deformation part 541g to be elastically deformed by an external force.

A first vertical support rod 541a constituting a first support column is upwardly extended from the first horizontal beam 541b and a second vertical support rod 541h constituting a second support column is downwardly extended from the third horizontal beam 541f.

As shown in FIG. 20, it is desirable that the first vertical support rod 541a and the second vertical support rod 541h be formed on different axial lines from those of the plurality of vertical beams 541c and 541e.

Figure 21:
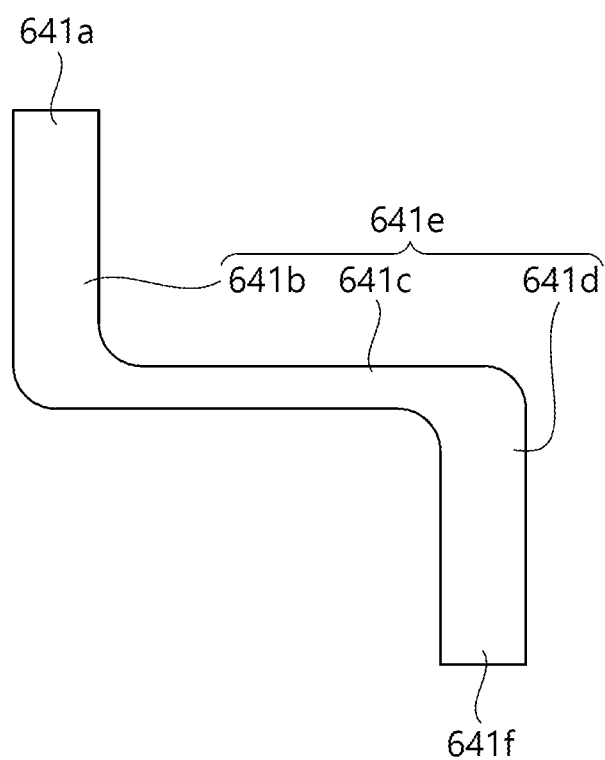

An elastic deformation part 641e of an elastic support 641 shown in FIG. 21 includes a pair of vertical beams 641b and 641d separated from each other and a horizontal beam 641c which connects the vertical beams 641b and 641d.

One side of the horizontal beam 641c is extended from the bottom of the first vertical beam 641b and the other side of the horizontal beam 641c is extended from the top of the second vertical beam 641d.

In addition, a first vertical support rod 641a constituting a first support column is upwardly extended from the first vertical beam 641b and a second vertical support rod 641f constituting a second support column is downwardly extended from the second vertical beam 641d.

Figure 22:
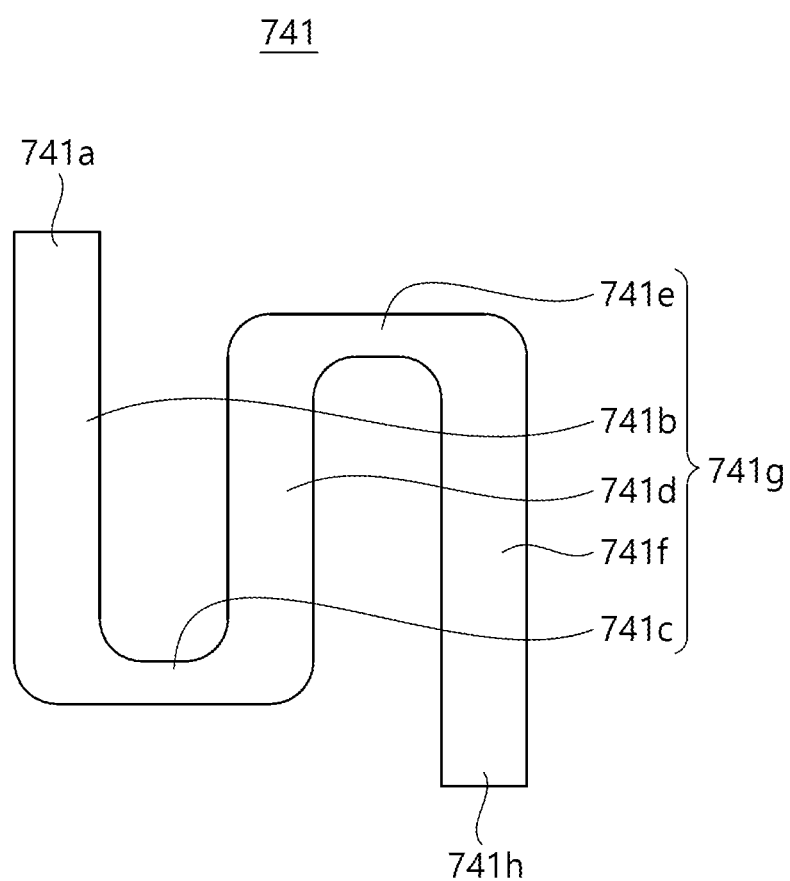

An elastic support 741 shown in FIG. 22 includes an elastic deformation part 741g formed in a zigzag shape.

More specifically, the elastic deformation part 741g includes a plurality of separated vertical beams 741b, 741d and 741f and a plurality of horizontal beams 741c and 741e which connect the plurality of vertical beams 741b, 741d and 741f.

The plurality of horizontal beams 741c and 741e include the first horizontal beam 741c which connects one side of the first vertical beam 741b to one side of the second vertical beam 741d, and the second horizontal beam 741e which connects the other side of the second vertical beam 741*d* to the other side of the third vertical beam 741*f*.

The first horizontal beam 741*c* and the second horizontal beam 741*e* are disposed on different axial lines to induce the elastic deformation part 741*g* to be elastically deformed by an external force.

A first vertical support rod 741*a* constituting a first support column is upwardly extended from the first vertical beam 741*b* and a second vertical support rod 741*h* constituting a second support column is downwardly extended from the third vertical beam 741*f*.

As described above, the capacitive sensors according to embodiments of the present invention detect force components Fx, Fy and Fz and torque components Tx, Ty and Tz which act in three axial directions on the basis of changes in capacitances of upper vertical electrodes, lower vertical electrodes, upper horizontal electrodes and lower horizontal electrodes using relative movement of an upper block and an lower block caused by an external force.

In addition, the capacitive sensors according to embodiments of the present invention are configured such that elastic supports respectively support the upper block and the lower block to improve durability against an external force (particularly, a force acting in the Z direction).

Furthermore, elastic supports have structures which are simple and are easily deformed by an external force, and thus costs and manufacture difficulty of capacitive sensors can be reduced.

Moreover, since elastic supports are provided as separate components combined with an upper block and a lower block, the elastic supports are easily changed and thus are advantageous for maintenance.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

A capacitive sensor according to an embodiment of the present invention includes: an upper block; at least one first electrode fixed to the upper block; a lower block positioned below the upper block; at least one second electrode fixed to the lower block such that at least a part thereof and the first electrode overlap; and a plurality of elastic supports including a first support column for supporting the upper block, a second support column for supporting the lower block, and an elastic deformation part connected to the first support column and the second support column and elastically deformed by an external force acting on at least one of the upper block and the lower block.

The invention claimed is:

1. A capacitive sensor comprising:
    an upper block;
    a lower block;
    a plurality of elastic supports for elastically supporting the upper block and the lower block;
    upper vertical electrodes formed to have faces perpendicular to the bottom surface of the upper block;
    lower vertical electrodes formed to have faces perpendicular to the top surface of the lower block and disposed to face the upper vertical electrodes such that at least parts of the lower vertical electrodes overlap with the upper vertical electrodes; and
    an electronic circuit including the upper vertical electrodes and the lower vertical electrodes as parts of the circuit and outputting a signal corresponding to changes in capacitances between the upper vertical electrodes and the lower vertical electrodes caused by a force or a torque applied to at least one of the upper block and the lower block.

2. The capacitive sensor of claim 1, wherein three or more upper vertical electrodes are provided, and lower vertical electrodes respectively corresponding to the upper vertical electrodes are provided.

3. The capacitive sensor of claim 1, wherein the upper vertical electrodes are formed to protrude or to be recessed from the bottom surface of the upper block.

4. The capacitive sensor of claim 1, wherein the lower vertical electrodes are formed to protrude or to be recessed from the top surface of the lower block.

5. The capacitive sensor of claim 1, wherein the upper vertical electrodes are formed on the side of the upper block and the lower vertical electrodes are formed to protrude from the top surface of the lower block.

6. The capacitive sensor of claim 1, wherein the upper vertical electrodes are formed to protrude from the bottom surface of the upper block and the lower vertical electrodes are formed on the side of the lower block.

7. The capacitive sensor of claim 1, further comprising:
    upper horizontal electrodes formed to have faces parallel with the bottom surface of the upper block or formed on the same plane as the bottom surface; and
    lower horizontal electrodes formed to have faces parallel with the top surface of the lower block or formed on the same plane as the top surface and disposed to face the upper horizontal electrodes such that at least parts of the lower horizontal electrodes overlap with the upper horizontal electrodes.

8. The capacitive sensor of claim 7, wherein the electronic circuit includes the upper horizontal electrodes and the lower horizontal electrodes as parts of the circuit, and the signal changes in response to changes in capacitances between the upper vertical electrodes and the lower vertical electrodes and changes in capacitances between the upper horizontal electrodes and the lower horizontal electrodes caused by a force or a torque acting on at least one of the upper block and the lower block.

9. The capacitive sensor of claim 8, wherein the signal includes information about each of force components Fx, Fy and Fz and torque components Tx, Ty and Tz acting in three intersecting axial directions.

* * * * *